(12) United States Patent
Delhaye

(10) Patent No.: US 11,021,279 B2
(45) Date of Patent: Jun. 1, 2021

(54) METHOD AND INSTALLATION FOR THE MANUFACTURE OF CAPSULES

(71) Applicant: POLYTEK INNOVATIONS, Sarreguemines (FR)

(72) Inventor: David Delhaye, Montigny les Metz (FR)

(73) Assignee: MELCHIOR MATERIAL AND LIFE SCIENCE FRANCE, Lacq (FR)

( * ) Notice: Subject to any disclaimer, the term of this patent is extended or adjusted under 35 U.S.C. 154(b) by 458 days.

(21) Appl. No.: 15/123,150

(22) PCT Filed: Mar. 6, 2015

(86) PCT No.: PCT/EP2015/054742
§ 371 (c)(1),
(2) Date: Sep. 1, 2016

(87) PCT Pub. No.: WO2015/132390
PCT Pub. Date: Sep. 11, 2015

(65) Prior Publication Data
US 2017/0217609 A1    Aug. 3, 2017

(30) Foreign Application Priority Data
Mar. 7, 2014   (FR) ...................................... 1451849

(51) Int. Cl.
*B65B 9/04*    (2006.01)
*B29C 65/00*   (2006.01)
(Continued)

(52) U.S. Cl.
CPC .............. *B65B 9/042* (2013.01); *B29C 65/08* (2013.01); *B29C 65/7443* (2013.01);
(Continued)

(58) Field of Classification Search
None
See application file for complete search history.

(56) References Cited

U.S. PATENT DOCUMENTS 1,387,805 A * 8/1921 Roberts ................... B29C 63/22
                                                          264/516
1,400,146 A * 12/1921 Eggers .................... B29C 49/46
                                                          156/196
(Continued)

FOREIGN PATENT DOCUMENTS

DE    1704120 A1    5/1971
DE    10306092 A1   8/2004
(Continued)

OTHER PUBLICATIONS

International Search Report for Application No. PCT/EP2015/054742 dated Jun. 5, 2015.

*Primary Examiner* — Hemant Desai
*Assistant Examiner* — Tanzim Imam
(74) *Attorney, Agent, or Firm* — Bachman & LaPointe, P.C.

(57) ABSTRACT

Manufacturing capsules, comprising preparing a first and a second capsule element, at least the first element containing a cavity, each element, being provided with a peripheral ring, bringing the elements together, so that the rings are superimposed, placing the two elements between a sonotrode and an anvil, the anvil containing an anvil recess and a striking surface, surrounding the anvil recess, the sonotrode including a sonotrode recess, with the same cross-section as the anvil recess, and a working surface surrounding the sonotrode recess, wherein the striking and working surfaces are configures to come into contact with each other on a working area, extending around the recesses, clamping the rings between the working surface and the striking surface by the proximity of a sonotrode and the anvil, (Continued)

activating the sonotrode and directing the ultrasound towards the anvil, whilst maintaining the clamping action, wherein the rings are detached from the capsule.

10 Claims, 1 Drawing Sheet

(51) Int. Cl.
| | |
|---|---|
| B29C 65/08 | (2006.01) |
| B29C 65/74 | (2006.01) |
| B29C 65/78 | (2006.01) |
| B65B 51/22 | (2006.01) |
| F42B 12/40 | (2006.01) |
| F42B 33/00 | (2006.01) |
| F42B 8/14 | (2006.01) |
| B65B 25/00 | (2006.01) |

(52) U.S. Cl.
CPC ...... *B29C 65/7814* (2013.01); *B29C 65/7855* (2013.01); *B29C 66/1312* (2013.01); *B29C 66/54* (2013.01); *B29C 66/73921* (2013.01); *B29C 66/81419* (2013.01); *B29C 66/8242* (2013.01); *B29C 66/8322* (2013.01); *B29C 66/83221* (2013.01); *B29C 66/849* (2013.01); *B65B 25/005* (2013.01); *B65B 51/225* (2013.01); *F42B 8/14* (2013.01); *F42B 12/40* (2013.01); *F42B 33/001* (2013.01); *B29C 66/1142* (2013.01); *B29C 66/71* (2013.01)

(56) References Cited

U.S. PATENT DOCUMENTS

| | | | | |
|---|---|---|---|---|
| 2,199,210 | A * | 4/1940 | Scherer | A61J 3/07 53/451 |
| 2,275,654 | A * | 3/1942 | Ravenscroft | A61J 3/07 53/451 |
| 2,279,505 | A * | 4/1942 | Ravenscroft | A61J 3/07 53/451 |
| 2,524,687 | A * | 10/1950 | Uhlig | B29D 99/0042 264/4 |
| 2,537,089 | A * | 1/1951 | Rempel | B29C 37/02 425/116 |
| 3,254,402 | A * | 6/1966 | Balamuth | B29C 66/43 228/171 |
| 3,299,193 | A | 1/1967 | Vergara | |
| 3,617,589 | A | 11/1971 | Jones-Hinton et al. | |
| 3,681,176 | A * | 8/1972 | Reifenhauser et al. | B29C 66/221 156/580.2 |
| 3,871,155 | A * | 3/1975 | Blaser | B65B 9/02 53/427 |
| 4,886,181 | A | 12/1989 | Haines | |
| 5,040,357 | A | 8/1991 | Ingemann | |
| 5,520,775 | A | 5/1996 | Fischl et al. | |
| 5,775,060 | A * | 7/1998 | Ferrero | B31F 1/20 53/453 |
| 6,451,205 | B1 * | 9/2002 | McGaw, Jr. | B29C 65/08 156/580.1 |
| 7,377,760 | B2 * | 5/2008 | Takayanagi | A61J 3/074 264/4 |
| 2002/0026771 | A1 * | 3/2002 | Brown | A61K 8/8129 53/454 |
| 2005/0138899 | A1 * | 6/2005 | Draisey | B29C 66/1122 53/454 |
| 2008/0000099 | A1 * | 1/2008 | Victorov | F26B 11/181 34/129 |
| 2010/0024360 | A1 * | 2/2010 | Ehrmann | B29C 66/8161 53/285 |
| 2013/0318924 | A1 | 12/2013 | Scaliti et al. | |

FOREIGN PATENT DOCUMENTS

| | | | |
|---|---|---|---|
| EP | 0264212 A2 | 4/1988 | |
| EP | 0344137 A1 | 11/1989 | |
| FR | 1453508 A * | 6/1966 | ............ B65B 9/042 |
| FR | 2943219 A1 * | 9/2010 | ............ A01N 25/26 |
| JP | S51100833 A | 9/1976 | |
| WO | 9523064 A1 | 8/1995 | |
| WO | 2009084045 A1 | 7/2009 | |
| WO | 2014016510 A1 | 1/2014 | |

* cited by examiner

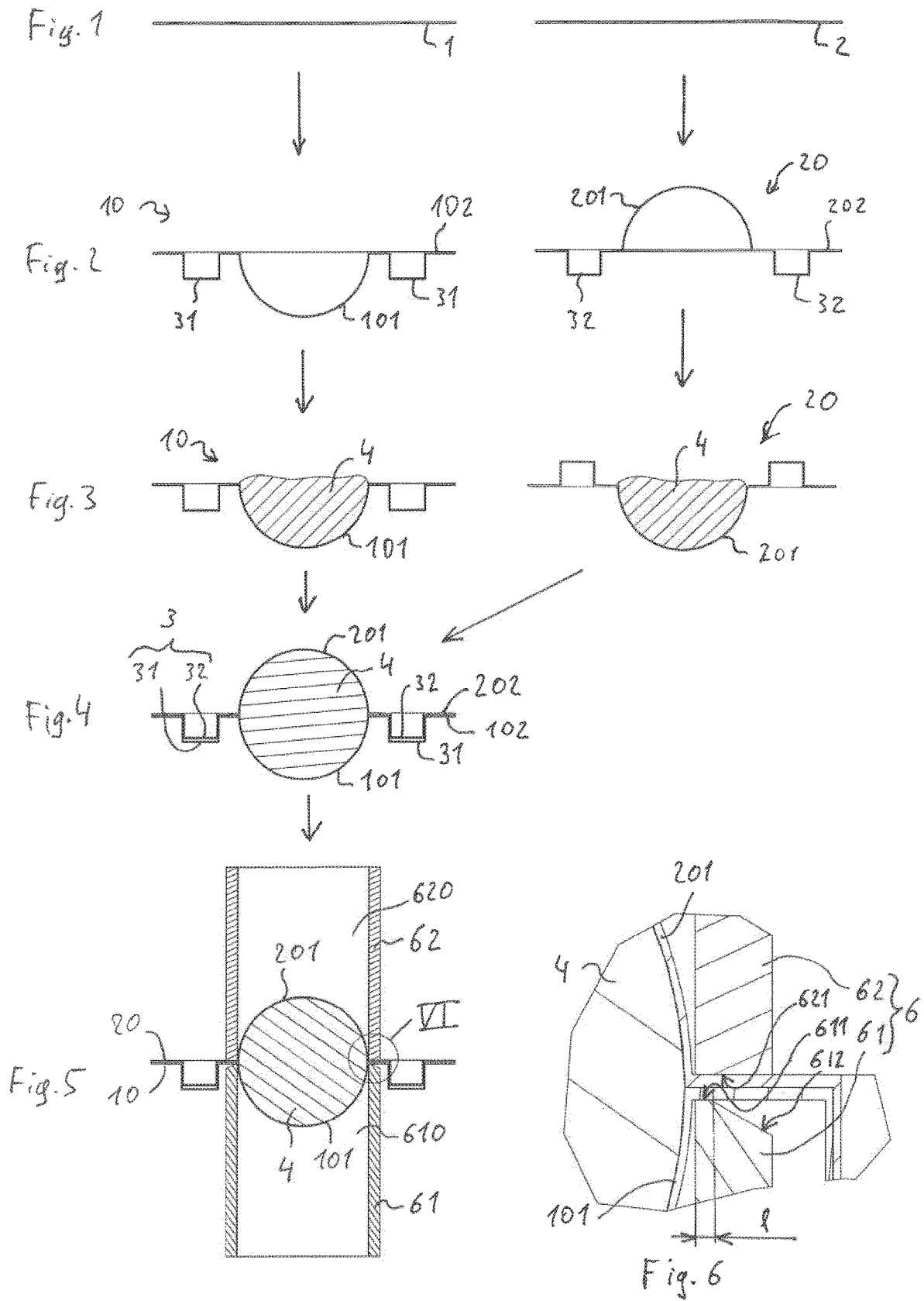

METHOD AND INSTALLATION FOR THE MANUFACTURE OF CAPSULES

BACKGROUND OF THE INVENTION

This invention relates to a capsule manufacturing process which assembles two elements which are formed from thermoplastic film. In particular, it relates to the manufacture of capsules which are at least partially filled by a substance in solid, fractionated, liquid, gas, or paste form. Most notably, but not exclusively, it is employed for paintballs used in military training or war games.

It also includes an installation to be used to put the aforementioned method into practice.

Many different technical domains use capsules containing substances in different states. In medicine, capsules are used to contain an active substance in powder form, for example. The capsule is ingested and the shell dissolves so that the active substance is released. In the domain of agriculture, the applicant has already proposed, in document FR 2 943 219 A1, the encapsulation of fertiliser or phytosanitary products, as a method of controlling their dispersal.

Another area of application of capsules is that of paintballs. In the context of this invention, the term "paintball" means a capsule, usually spherical, which is comprised of a shell, and a composition containing marker paint, within this shell.

In this context, the nature of the constitutive material of the shell and its dimensions (notably its thickness) must be such that the impact of a paintball on a target causes the shell to break and the marker paint composition to spread over the target, indicating that the target has been hit.

Currently, such paintballs are made with a gelatine shell, following a widely used method used for the manufacture of medicines. This method includes the moulding, by thermoforming, of two hemispheres, which are welded together. The paint composition is introduced into the cavity delimited by the two hemispheres.

However, this paintball presents a number of problems, linked to the nature of the shell.

Given that the gelatine is of animal extraction, it is an unstable material to work with and it is difficult to obtain a consistent and repeatable composition. In addition, the manufacture of gelatine capsules must take place in controlled atmospheric conditions, given that gelatine is highly sensitive to humidity and temperature. This sensitivity is generally observed as follows: once a certain level of humidity has been reached, the gelatine softens, whilst at high temperatures, it tends to dry out. In addition, should the capsule freeze, the water contained in the gelatine crystallises, resulting in the gelatine losing some of its mechanical properties. Another consequence is that strict transport and storage conditions are necessary, often requiring an area to be at a certain temperature, both before and after the paintballs have been sold.

Lastly, the gelatine's sensitivity to humidity means that non-aqueous, solvent-based paint compositions must be used, such as ethylene glycol, polyethylene glycol, or polypropylene glycol. These non-aqueous paint compositions are usually viscous gels and contain solvents which are harmful to the environment.

The applicant has proposed, in document WO2009/0747201 A1, a capsule with a shell made from oxo-biodegradable thermoplastic material. If made from this material, the shell could be left in a natural environment without causing harm, as it would naturally disappear, without leaving remains. However, the manufacturing method requires the use of a paint composition which could withstand high temperatures, so that the thermoforming could be done at the same time as the capsule is filled.

The invention therefore aims to provide a method and a machine for the manufacture of capsules or balls, enabling the use of a material for the shell which is non-sensitive to humidity, independently of the material used for the liquid filling.

SUMMARY OF THE INVENTION

Given the objectives, the invention aims to provide a method of capsule manufacture, characterised by the following stages:
  a) an initial preparation stage, including the preparation of a first and second capsule element, formed from thermoplastic film, at least the first element including a cavity, each element being provided with a peripheral ring,
  b) a stage to bring the first and second elements together, so that the rings become superimposed,
  c) a placement stage, to place the set of the two elements between a sonotrode and an anvil, the anvil including an anvil recess and a striking surface surrounding the anvil recess, the sonotrode including a sonotrode recess with the same cross-section as the anvil recess, and a working surface surrounding the sonotrode recess. The striking and working surfaces are designed to come into contact with each other on a working area extending around the recesses, the working area having a width of between 0.05 and 1 mm,
  d) a clamping stage, during which the rings are clamped between the working surface and the striking surface by the proximity of the sonotrode and the anvil,
  e) a welding stage, during which the sonotrode is activated, using ultrasound aimed towards the anvil, maintaining the elements in place until they have been soldered, and the cut-out is realised, by detaching the rings from the capsule.

Welding by ultrasound enables the problem of the temperature constraints, when the capsule is closed, to be overcome. In addition, it has been possible to carry out the soldering and cut-out stages together, saving significant time. As a consequence of the presence of working and striking surfaces, next to each on a defined width, which pinch the superimposed rings, a melted area is formed by the application of ultrasound, which is sufficient to bind together the two capsule elements. The melted area is pushed away, when the elements are clamped and the sonotrode is near the anvil, in such a way that part of the material bulges towards the recesses. This bulge ensures that the elements are joined together, after cooling and solidification. With this method, only the area which is pinched between the working surface and the striking surface is heated.

According to another particular embodiment, the second element may also have a cavity, the elements being semi-spheres so that together they form a ball-shape. If this is the case, the recesses have a circular cross section. The finished capsule only has a small weld joint, with a depth less than 0.1 mm.

With an additional improvement in the process, between steps "a" and "b", (preparation and bringing-together) the cavity can be filled with a liquid or a solid in fractured form, during a filling stage. The cavities are made before filling, and the cooling can be done before the filling material is applied. The filling material is therefore not affected by risks of high temperatures. After the welding stage, the material is stored in an enclosed area, protecting it from atmospheric conditions.

With another improvement to the method, between steps "a" and "b" (preparation and bringing-together), the cavity is filled with a gel, during a filling stage. The gel enables the entire capsule to be filled. In addition, when both elements contain cavities, it is possible to fill both of them and turn one of them over, in order to bring them together, without the material falling out of the capsule. The gel naturally adheres to the internal wall of the cavities and remains in one piece.

According to another particular embodiment, the volume of gel deposited in the cavity is greater than the volume of the cavity itself.

Ideally, during stage "b" (bringing-together), the rings will be tightened together so that the excess gel will be expelled outside them. This ensures that entire capsule will be filled with gel, with no residual air.

According to another particular embodiment, the gel is a paint and the capsule is a paintball. The ball produced with a shell of thermoplastic material can be filled with water-based paint, unlike the gelatine capsules used with prior art. Thermoplastic material, such as polyethylene or polypropylene, is not affected by water. Water-based paint is less harmful for the environment. In addition, the storage conditions are less restrictive, as it is not necessary to protect the balls from humidity. The case of the ball is also unaffected by extreme environmental temperatures.

Other Advantageous Features the width of the working area is between 0.1 and 0.4 mm. The narrower width is suited to films of greater thickness as it makes the cut-out easier, whilst the greater widths are suited to thinner films, in order to melt a sufficient quantity material to form the bulge, which will join the two elements, the power of the ultrasound during welding stage "e" increases. An initial moderate power level enables any excess material between the rings to be expelled, and begins the heating process that will soften the thermoplastic material. An increase in the power at the end of the operation ensures that the join is made from one single bulge of material from the rings, and that it is expelled until cut-out is achieved, the frequency of the ultrasound used is between 25 and 40 kHz, ideally between 30 and 35 kHz, as the best results have been achieved with these frequencies, during preparation stage "a", the rings are provided with retention profiles. Stage "b", bringing-together, is completed by the joining of the retention profiles, to assemble the first element to the second element. They also make transporting the assembly formed by the two elements easier. These retention profiles may be temporary welds, or shapes which slot or lock together, the first element is taken from a first strip, and the second element is taken from a second strip. The elements are therefore linked to each other, making it easy to transport them from one workstation to another, the first and the second elements are made of biodegradable thermoplastic. The use of a biodegradable material is advantageous for applications where the capsules are used and will remain outside, as the shells will biodegrade and disappear. The material contained in the capsule will also be released or break down.

Another object of the invention is an installation for the manufacture of capsules, characterised by receptable means for a first and a second capsule, formed from thermoplastic film material, with the first element at least containing a cavity, both elements being provided with a peripheral ring, means of bringing-together the first and second elements so that the rings are superimposed, welding means including a sonotrode and an anvil, the anvil including an anvil recess and a striking surface surrounding the anvil recess, the sonotrode including a sonotrode recess with the same cross-section as the anvil recess, and a working surface surrounding the sonotrode recess. The working and striking surfaces are designed to come into contact with each other on a working area extending around the recesses, the area being between 0.05 and 1 mm wide. The welding means include a clamping mechanism to hold the rings between the working surface and the striking surface, through the proximity of the sonotrode and the anvil, and means for generating ultrasound, to generate ultrasound in the sonotrode, to be directed towards the anvil. The installation will put into practice the method, according to one of claims 1 to 13.

BRIEF DESCRIPTION OF THE DRAWINGS

The invention is better understood, and other advantages and specificities will appear clearer, upon reading the following section, which makes references to appended drawings including:

FIG. 1, a profile diagram of a first and a second thermoplastic film before forming, FIG. 2, a similar diagram to FIG. 1, of two elements after the forming stage, FIG. 3, showing the filling stage, FIG. 4, showing the bringing-together stage, during which the two elements are assembled, FIG. 5, showing the two elements being welded together, FIG. 6, a detailed view of VI from FIG. 5.

DETAILED DESCRIPTION

An embodiment of the invention will be described, with regards to the manufacture of paintballs, although the method may be applied to the production of capsules with other applications.

FIG. 1 shows a first and a second film, 1 and 2, made from an oxo-biodegradable thermoplastic material, such as polyethylene or polypropylene, with a thickness of between 0.1 and 0.5 mm, preferably between 0.2 and 0.3 mm.

With regards to FIG. 2, a first element 10 is formed from the first film 1, and a second element 20, is formed from the second film 2. In order to do this, each film 1, 2 is heated in order to soften it, and then subject to thermoforming, using a well-known method, by applying a punch against dies, not shown here, possibly combined with aspiration or air-blowing on the dies. Through this process, the first element 10 is formed, with a first hemispheric cavity 101, and the first ring 102 surrounding the first cavity 101 as well as the first two basins 31 originating from the first ring 102 on the same side as the first cavity 101 in relation to the position of the first ring 102. The second element 20 is formed with a second hemispheric cavity 201 a second ring 202 surrounding the second cavity 201, as well as two second basins 32 originating from the second ring 202 on the opposite side of the second cavity 201 in relation to the position of the second ring 202. Several elements can be made at the same time from the same film, as it is cut before or after a thermoforming operation, to form a strip of elements 10 and 20, one after the other. When several strips have been obtained from wide films, it is possible to separate each of them and use them at different workstations, with each workstation carrying out filling and welding independently. Should one workstation become inoperative, the other workstations can continue to operate.

The first and the second elements 10 and 20 cool down after forming and hardening. They are taken to a filling workstation where a maker paint, in the form of a gel 4, is placed into cavities 101 and 201, as shown in FIG. 3. The volume of gel used is slightly higher than the volume of cavities 101 and 201.

The second element 20 is brought back and pressed against the first element 10 by a means of bringing the elements together, not represented, so that they are in a position as show in FIG. 4. During the bringing-together stage, the cavities 31 and 32 slot together by pairing the first cavities 31 with the second cavities 32, so the retention profiles 3 are formed.

The next stage is represented by FIGS. 5 and 6. The assembly 5 made up of the two elements 10 and 20 is placed in the welding means 6, between an anvil 61 and a sonotrode 62. The anvil 61 contains an anvil recess 610 which has a cylindrical shape with a circular cross-section and a striking surface 611 surrounding the anvil recess 610. The striking surface 611 is extended towards the exterior by a release surface 612, which has a truncated cone shape. The sonotrode 62 includes a sonotrode recess 620 with the same cross-section as the anvil recess 610, and a working surface 621 surrounding the sonotrode recess 620. The striking and working surfaces 611 and 621 are designed to come into contact with each other on a working area, extending around the recesses 610 and 620, the area having a width, I, of between 0.05 and 1 mm. The welding means 6, also contains a clamping means, not represented, to bring the sonotrode 62 into position and clamp it against the anvil 61. The welding means 6 also contain a means for generating ultrasound, not represented, to generate ultrasound in the sonotrode 62, which is directed towards the anvil 61. The cavities 101 and 201 of the elements 10 and 20 are housed in the anvil recesses 610 and the sonotrode recess 620, respectively, as shown in FIG. 5. The anvil and the sonotrode are slidably mounted, facing each other, on the same axis, and are activated by actuators, using, for example, pneumatics, not represented in the diagram.

During the welding stage, after the set of the two elements 10 and 20 is placed between the sonotrode 62 and the anvil 61, these components are brought together by the actuators until they clasp the rings 102 and 202. A clamping force is maintained for a sufficient period to bring the rings 101 and 202 into contact with each other, whilst expelling the gel 4 towards the exterior of rings 102 and 202. The ultrasound generation means is then activated, in order for the welding to be carried out. Whilst the pressure is maintained, power is applied at an initial level, in order to expel the residual gel 4 between the rings 102 and 202 next to the working and striking surfaces, at the edge of the cavities 101 and 201. When the material is at a sufficient temperature, the ultrasound power is increased. At the welding area, the material of the two rings 102 and 202 comes together and forms a bulge, which is expelled towards the cavities 101 and 201. The sonotrode 62 and the anvil 61 come into contact with each other in such a way that no material remains between the rings 102 and 202 and the cavities 101 and 201. The welding then ceases, the ultrasound is stopped and the cavities 101 and 102 form a capsule, in the form of a paintball, which is evacuated via one of the recesses 610 and 620. The sonotrode 62 and the anvil 61 move away and the leftover rings 102 and 202 are evacuated. The operation may be repeated in order to manufacture another capsule.

Production tests have been carried out, with variations in certain parameters. The results shown below are for tests which were carried out with one single polypropylene film with a thickness of around 0.45 mm. The width of the working surface was 0.2 mm. The cavities 101 and 201 were thermoformed to give a hemispheric shape with a diameter of around 12.7 mm. The ultrasound power was maintained at a constant level of 35 kHz throughout the entire welding and cut-out stages. An initial test stage was conducted, without fill. A second test phase was carried out, with each cavity being filled with a water-based paint in the form of a gel.

The parameters which were varied were: the air pressure in the 40 mm actuators, the duration for which the ultrasound was applied, and the power of the ultrasound (the figure of 80% given below corresponds to an amplitude of 39 μm).

TABLE 1 pressure at 4 bar

| Test | Ultrasound Power | Duration of welding (s) | Welding | Cut-out | Runout |
|---|---|---|---|---|---|
| 1 | 80% | 0.1 | Yes | Non | |
| 2 | 80% | 0.2 | Yes | Yes | Good |
| 3 | 80% | 0.3 | Open | Yes | |

TABLE 2 pressure at 4 bar

| Test | Ultrasound Power | Duration of welding (s) | Welding | Cut-out | Runout |
|---|---|---|---|---|---|
| 4 | 90% | 0.1 | Yes | No | Poor |
| 5 | 90% | 0.2 | Open | Yes | |
| 6 | 90% | 0.3 | Open | Yes | |

TABLE 3 pressure at 1.5 bar

| Test | Ultrasound Power | Duration of welding (s) | Welding | Cut-out | Runout |
|---|---|---|---|---|---|
| 7 | 80% | 0.1 | No | No | |
| 8 | 80% | 0.2 | No | No | |
| 9 | 80% | 0.3 | Yes | No | Poor |

TABLE 4 pressure at 6 bar

| Test | Ultrasound Power | Duration of welding (s) | Welding | Cut-out | Runout |
|---|---|---|---|---|---|
| 10 | 80% | 0.1 | No | No | |
| 11 | 80% | 0.2 | Yes | No | Poor |
| 12 | 80% | 0.3 | Open | | |

It was observed that from the numerous tests, very few combinations of parameters showed a positive result. The criteria which were evaluated were the following:

Welding: were the cavities joined together? If yes, were the joints open? The expectation is that the capsule is closed and completely sealed.

Cut-out: was this done?

Runout: was the bulge formed in the formed capsule? The formulation of the bugle demonstrates that welding has been successful.

It was concluded that if the duration of ultrasound is not sufficient, the cut-out is not realised (tests 1 and 2). The welding is also affected by an insufficient ultrasound duration (tests 9 and 8). Excessive power makes the duration of welding difficult to control (tests 4 and 5), making it difficult to obtain both cut-out and a well-sealed joint. The force with which the sonotrode is applied to the anvil is also crucial. If not enough force is applied, the welding joint is not well sealed (table 3). If too much force is applied, the anvil and the sonotrode rapidly come into contact with each other, causing a fault in the machine to occur, before the cut-out is realised (table 4).

With the parameters thus defined, paintballs containing water-based paint were manufactured. Test-firing was successful, in so far as the paintballs did not explode when they were fired, even when fired at high power (330 feet per second), but did explode when they hit the target. The paintball trajectory was sufficient, enabling a target to be reliably hit from a distance of 20 meters.

The invention is not restricted to the embodiment which has just been described, as an example. The cross-section of the recesses 610 and 620 may be of any diameter. The cavities 101 and 201 can also be of any shape. The cavities 101 and 201 may also be filled only partially, by a fractionated solid material, or by a liquid.

The invention claimed is:

1. A method for manufacturing capsules, the method comprising:
   a) a preparation stage including preparation of a first capsule element and a second capsule element formed from thermoplastic material, the first and second elements each having a cavity with a shape of a semisphere, the first and second elements forming a capsule in a shape of a ball, each element being provided with a peripheral ring;
   b) a stage during which the first and second elements are brought together, so that the rings are superimposed, after the cavities have been filled with gel during a filling stage, wherein a volume of the gel deposited in each cavity is greater than a volume of the cavity;
   c) a placement stage, for placement of the first and second elements between a sonotrode and an anvil, the anvil including an anvil recess, and a striking surface surrounding the anvil recess, the sonotrode including a sonotrode recess with the same cross-section as the anvil recess, and a working surface surrounding the sonotrode recess, wherein the striking and working surfaces are configured to come into contact with each other at a working area extending around the recesses, the area having a width of between 0.05 and 1 mm;
   d) a clamping stage, during which the rings are clamped between the working surface and the striking surface by proximity of the sonotrode and the anvil; and
   e) a welding stage, during which the sonotrode is activated and directs ultrasound towards the anvil, whereby power of the ultrasound increases from an initial moderate power level configured to soften the thermoplastic material and form a bulge which is expelled toward the cavities, while maintaining clamping of the rings, and then the power is increased further at an end of the welding stage until the first and second elements are welded together and cut-out has been achieved, whereby the rings are detached from the capsule.

2. The method, in accordance with claim 1, wherein, during stage "b", the rings are clamped against each other so that excess gel is expelled beyond the rings.

3. The method, in accordance with claim 2, wherein the gel is a paint and the capsule is a paintball.

4. The method, in accordance with claim 3, wherein the width of the working area is between 0.1 and 0.4 mm.

5. The method, in accordance with claim 1, wherein the frequency of the ultrasound is between 25 and 40 kHz.

6. The method, in accordance with claim 5, wherein the rings are provided with retention profiles during the preparation stage, "a", and wherein stage "b" is completed by joining the retention profiles, so that the first and the second elements are assembled.

7. The method in accordance with claim 6, wherein the first element is taken from a first strip, and the second element is taken from a second strip.

8. The method, in accordance with claim 7, wherein the first element and the second element are made from biodegradable thermoplastic material.

9. An installation for manufacturing capsules, the installation comprising: receptacle means for a first capsule element and a second capsule element formed from a film made of thermoplastic material, at least the first element containing a cavity, each element being provided with a peripheral ring, each said peripheral ring being configured to superimpose in such a way as to superimpose the rings; and welding means including a sonotrode and an anvil, the anvil including an anvil recess and a striking surface surrounding the anvil recess, the sonotrode including a sonotrode recess with the same cross-section as the anvil recess and a working surface surrounding the sonotrode recess, wherein the working and striking surfaces are configured to come into contact with each other at a working area extending around the recesses, the area having a width of between 0.05 and 1 mm, wherein the welding means is configured to clamp the rings between the working surface and the striking surface by proximity of the sonotrode and the anvil, and wherein said sonotrode is configured to generate ultrasound directed towards the anvil, the installation putting into practice the method in accordance with claim 1.

10. The method, in accordance with claim 1, wherein a frequency of the ultrasound is between 30 and 35 kHz.

* * * * *